…

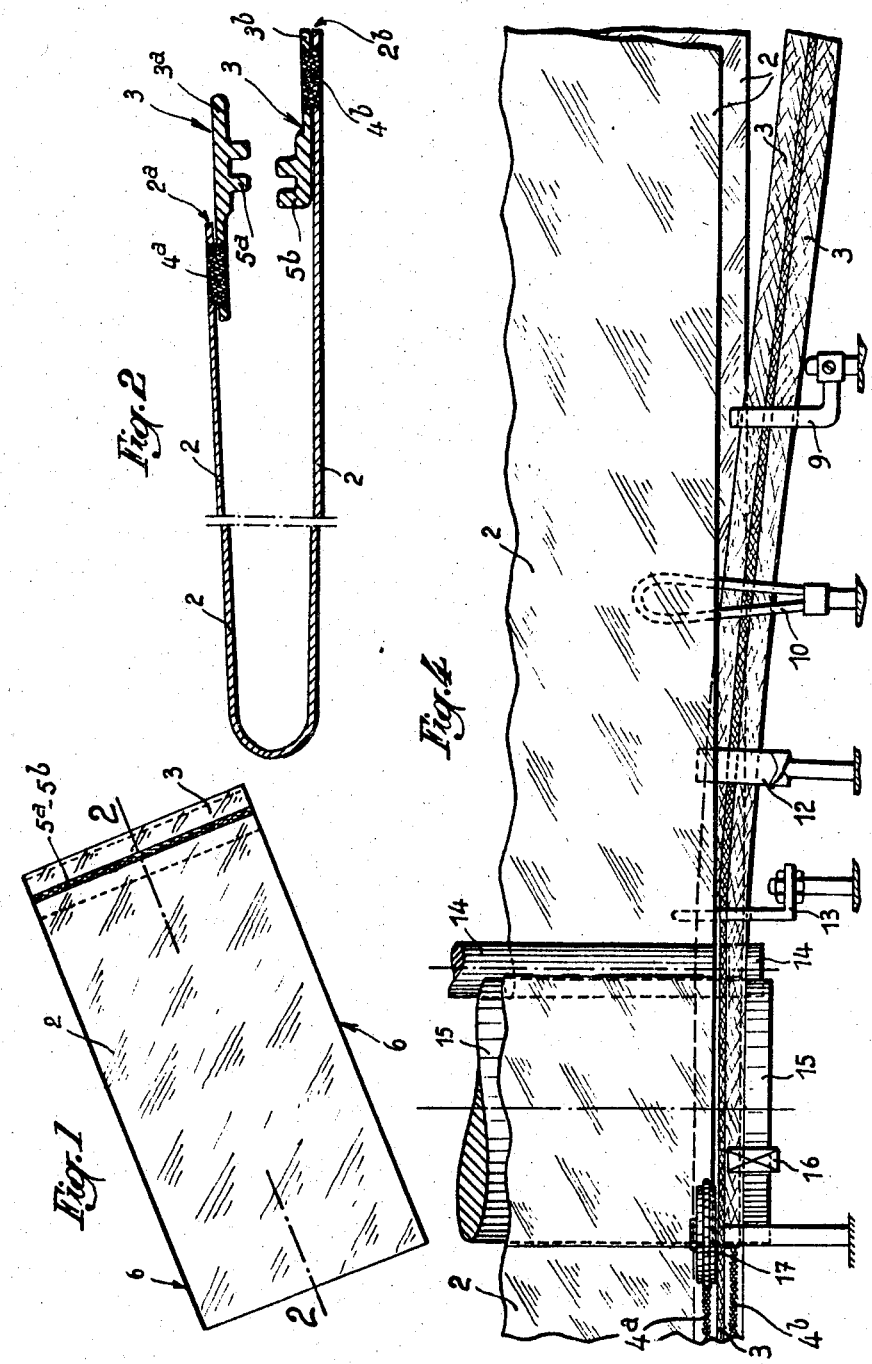

United States Patent Office 3,381,592
Patented May 7, 1968

3,381,592
MACHINE FOR PRODUCING BAGS OF
PLASTIC MATERIAL
Leon Ravel, Sainte-Sigolene, Haute-Loire, France, assignor to Fayard & Ravel, Sainte-Sigolene, Haute-Loire, France, a company of France
Filed June 17, 1965, Ser. No. 464,677
Claims priority, application France, Aug. 7, 1964, 8,982, Patent 1,412,593
2 Claims. (Cl. 93—8)

ABSTRACT OF THE DISCLOSURE

A bag making machine in which a sheath with opposite edges and a pair of closing strip sections are fed in edgewise superposition to two drums each receiving in turn opposite surfaces of the sheath and strips, the strips being welded to the sheath at its edges by means of a welding wheel cooperating with each drum, the opposite sides of the sheath and strips being transversely welded together intermittently and then cut to form bags at a welding station downstream of the drums, a first compensating system being interposed between the drums and the downstream welding station to compensate for the intermittent stoppage at the downstream station and a compensating and regulating system between the downstream welding station and the first compensating system for modifying the speed of the drums to compensate for elongation or slipping of the sheath and strips engaging the drums.

---

Figure 3:
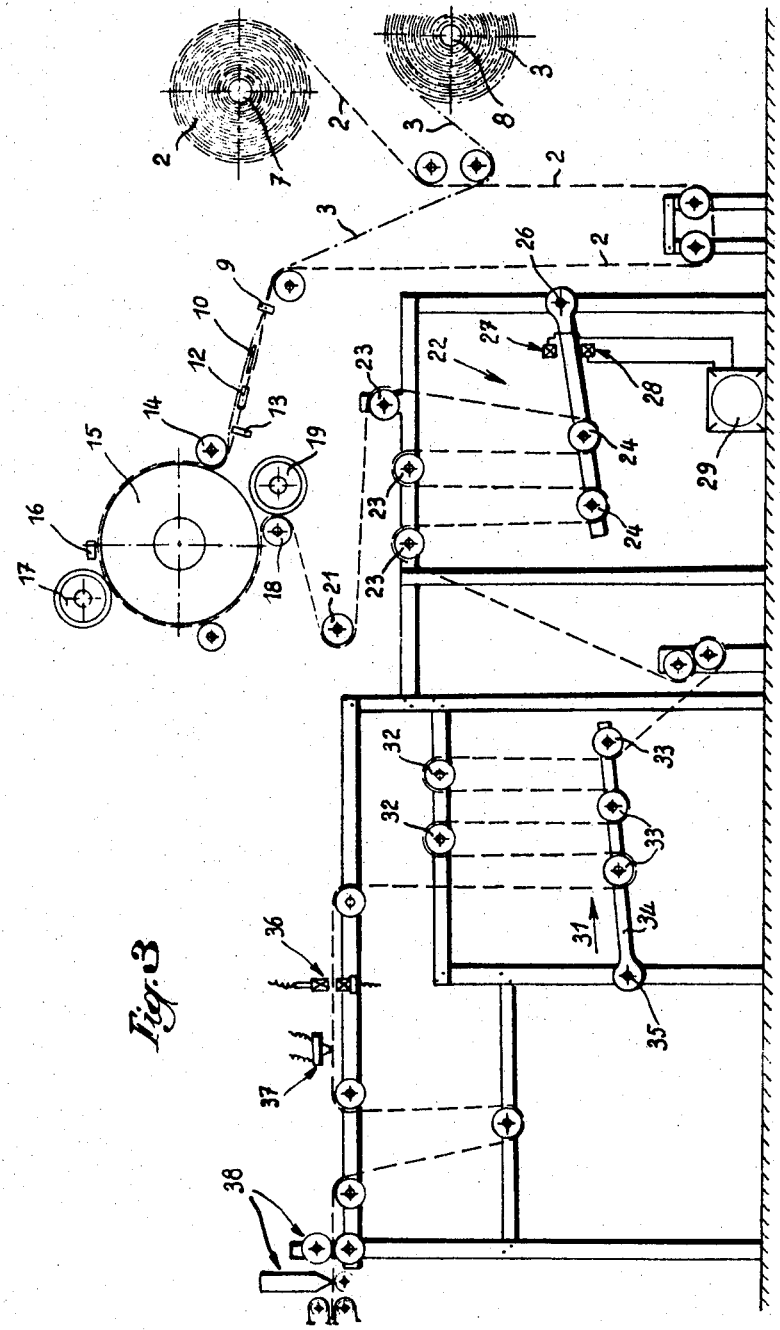

This invention relates to a machine for producing bags of plastic material of the type obtained by cutting and welding transversely a continuous roll constituted by a sheath of plastic material of an unlimited length, the main feature of which consists in that one longitudinal edge of the sheath projects beyond the cooperating edge by a predetermined amount as provided during the extrusion of said sheath, so as to allow securing thereto a strip constituted by two tape-shaped elements provided with cooperating sections ensuring their interengagement when fitted on the sheath.

Said sheath is obtained by a method consisting in setting two razor blades spaced by the desired distance respectively in registry with the front surface and with the rear surface of the sheath during the extruding procedure. The sheath, after passing underneath said razor blades so as to show a projecting tongue or edge, is wound around two identical drums located respectively on the front surface of the drawing apparatus and on the rear surface of the latter. The rolls thus obtained are positioned on the machine so as to receive the closing strips to be welded thereto.

The improved machine allows, starting from such a sheath, executing said bags in a continuous manner in spite of the discontinuity of its operative steps constituted by the transverse welding and transverse cutting required respectively for defining the ends of the bags with reference to each other and for separating them materially from each other, said transverse welding and cutting operations being of course executed only when the sheath which is to form the bags is at a standstill, whereas the securing of the closing strip to said sheath is executed in a continuous manner, that is without any stoppage.

To this end, the machine includes in combination:

A welding station operating continuously in order to connect the sheath which is to form the bags with its closing strip, said station including two rotary welding wheels engaging two successive drums provided with an insulating coat and over which the two strips to be assembled are caused to pass, said drums being arranged in a manner such that said strips rest respectively on one drum through one of their surfaces and on the other through their opposite surface.

A station for the simultaneous transverse welding and cutting so as to define the ends of the successive bags and to separate them from one another, said station including parts executing non-continuous movements.

A compensating system constituted by parallel rollers arranged in staggered relationship and engaged by the sheath and the strip secured thereto longitudinally so that said system may absorb a predetermined length of the strip and of the sheath in the area extending between the two above-mentioned welding stations, so as to provide a continuous tensioning of said strip and of said sheath in spite of the discontinuity of the transverse welding and cutting operation.

A compensating and adjusting system, also constituted by parallel rollers arranged in staggered relationship and over which the sheath and strip are caused to pass, said system being adapted to provide periodically a modification in the rotary speed of the longitudinally welding drums whereas the speed of the rollers winding in the strip and the sheath during the periods of rotation is constant, as required so as to take into account the elongation of the sheath and of the strip, their slipping over the winding rollers and the shifting of the possible ornamentation or printed matter carried by the sheath.

The parallel rollers forming the last-mentioned compensating and adjusting system are carried partly by a frame adapted to rock between two limit positions defined by two electric switches which, upon impact of the frame against them, modify the speed of rotation of the longitudinally welding drums, an increase in speed being provided by the closing of one of said switches and a reduction in speed by the closing of the other switch.

Through this combination of means, the improved machine allows producing automatically bags of plastic material of the type referred to with a particularly high yield without any inspection being practically necessary.

The invention will be well understood together with its advantages and further features thereof from a reading of the following description, reference being made to the accompanying drawings illustrating, by way of example and by no means in a limiting sense, a preferred embodiment of the machine according to our invention. In said drawings:

FIG. 1 is a plan view of a bag executed on the machine according to the invention, FIG. 2 is on a larger scale, a sectional view, through line 2—2 of FIG. 1 of the bag in an open condition, FIG. 3 is a lateral elevational view of the machine considered as a whole, FIG. 4 is a view from above, on an enlarged scale with reference to FIG. 3, of a part of the main longitudinal welding drum serving for the welding together of the sheath and of the strip, said FIG. 4 showing the guiding members provided respectively for said sheath and for said strip.

The bags executed on the machine according to the invention are illustrated in FIGS. 1 and 2. They are obtained starting from a sheath of plastic material 2 slotted longitudinally and of which the two longitudinal edges 2a and 2b are shifted laterally with reference to each other so as to allow the welding of a closing strip 3 made of two sections 3a and 3b welded to the sheath at points 4a and 4b lying in proximity with said edges 2a and 2b of the sheath 2; each of said sections 3a and 3b is provided on its surface facing the other section with projections, 5a and 5b respectively adapted to interengage with a view to closing the bag. It is furthermore necessary for the closing strip to have its two sections in a closed condition at the moment of the laying of the strip whereas, according to another well-known prior laying system, each section of the closing means is positioned separately. The bag is closed transversely by the two welds 6.

Such bags 2 are obtained starting from two rolls, to wit a roll feeding the sheath and designated also by the reference number 2 in FIG. 3 and a roll adapted to feed the closing strips designated similarly by the reference number 3 in FIG. 3. Said two rolls carried on independent parallel spindles 7 and 8 are unwound simultaneously by a tractional stress exerted on the sheath 2 and on the strip 3.

After passing over transmission rollers guiding them along separate paths, the sheath 2 and the strip 3 are superposed and engage each other, as illustrated in FIGS. 2 and 4; to this end, a guiding system is used, which includes a plurality of members, to wit a guiding member 9 acting on the strip 3, a projection 10 opening the sheath 2 so as to allow the partial insertion of the strip 3 into said sheath, a second guiding member 12 providing both for the guiding of the strip 3 and for the shifting apart of the two sides of the sheath 2 and a guiding member 13 giving the strip 3 the required position with reference to the sheath 2.

The sheath 2 and the strip 3 being thus positioned with reference to each other, are fed by a roller 14 onto a drum 15 provided with a coat having as a base a silicone. Said drum assumes a continuous rotary movement transmitted to it by a driving and speed reducing unit. The sheath 2 and the strip 3 thus carried along and driven by the drum 15 pass in succession under a last guiding member 16 and under a welding wheel 17 executing the weld at 4a so as to connect the edge 2a of the sheath with the section 3a of the closing strip (FIG. 2).

After this first welding stage, the sheath 2 and the strip 3 are fed off the drum 15 onto a second drum 18 also provided with a coat having as a base a silicone, but the diameter of which is smaller than that of the drum 15. By reason of this arrangement of the drums 15 and 18, the sheath 2 and the strip 3 engage the drum 18 through their surface opposed to that through which they engage the drum 15. This reversal allows a welding wheel 19, rotating in contacting relationship with the drum 18, to execute the weld 4b connecting the edge 2b of the sheath 2 with the section 3b of the closing strip as shown in FIG. 2. The welding wheels 17 and 19 are removable and shiftable so as to allow welding various types and breadths of closing strips.

The sheath 2 and the strip 3 being thus completely and positively assembled together are drawn along by transmission rollers located at the other end of the machine and, after they have passed over a further guiding roller 21, they enter a regulating and compensating system 22 including a plurality of guiding rollers 23 having stationary parallel carrier spindles and a further plurality of guiding rollers 24 of which the carrier spindles are fitted in parallelism in a frame 25 adapted to rock around a stationary spindle 26 parallel with the roller spindles. Said frame 25 is adapted to move between two predetermined limit angular positions defined by stops forming electric switches 27 and 28 inserted in a circuit passing through the driving and speed reducing unit 29 which drives the two above-mentioned longitudinal welding drums 15 and 18. When the frame 25 abuts against the switch 27, the speed of rotation of the driving and speed reducing unit 29 and consequently of the drums 15 and 18 increases, whereas whenever the frame 25 abuts against the switch 28, the speed of rotation of the above-mentioned unit, is reduced.

After passing through the compensating and regulating system 22, the sheath 2 and the strip 3 engage a second compensating system 31 including a plurality of rollers 32 carried by stationary parallel spindles and rollers 33 carried by spindles fitted in parallelism in a further frame 34 adapted to rock around a stationary spindle 35 parallel with the roller spindles.

The frame 34 of said compensating system 31 assumes automatically a rocking movement which allows it to absorb and to release periodically a predetermined length of the sheath 2 and of the strip 3 as a consequence of the continuous operation of the section of the machine including the longitudinal welding station 15, 17, 18, 19 whereas the section of the machine extending beyond the compensating system 31 includes parts assuming an intermittent motion.

After the sheath 2 and strip 3 have passed through the compensating system 31, they pass in fact through a station 36 for reinforcing the weld and a station 37 controlling the intermittent operation of the welding station 38 including transmission rollers and an electrode for transverse welding and cutting.

As already mentioned, the compensating means 31 act solely to absorb and to release periodically a predetermined length of the sheath 2 and of the strip 3 as a consequence of the continuous operation of the longitudinal welding station as opposed to the intermittent operation of the transverse welding and cutting station 38 so that the frame 34 of said compensating means assumes thus a permanent reciprocatory angular movement.

The compensating system 22 arranged ahead of the compensating system 31 and on the downstream side of the longitudinal welding station, acts in a quite different manner. It is not intended, as a matter of fact, to store and release a predetermined length of the sheath 2 and of the strip 3 at each transverse welding and cutting stage provided for the sheath 2 and the strip 3, and its part consists in forming compensating means modifying the speed of the drums 15 and 18 over which the two longitudinal welds are being executed with a view to taking into account the elongation of the sheath 2 and of the strip 3, their slipping over the transmitting rollers assuming a constant speed during their rotary movement and also with a view to taking into account, if required, the shifting of any printed matter or ornamentation, which may hav been impressed previously on the sheath 2.

Obviously, our invention is not limited to the sole embodiment of the machine which has been disclosed hereinabove by way of example and it covers in contradistinction, all the modifications and applications thereof falling within the scope of the accompanying claims and, in particular, it may serve for the laying of any closing strips whether under pressure, with a slider, with a simple or double lipped guard or the like.

What I claim is:

1. A machine for making bags of plastic material out of a continuous longitudinally slotted sheath having one side broader than the other and of a closing strip including sections longitudinally welded over the corresponding edges of the sides of the sheath, said machine comprising means feeding the sheath and the closing strip, a longitudinally welding station including two drums having insulating surfaces and adapted to receive each in its turn in edgewise superposition the sheath and the strip from the corresponding means with the opposite surfaces of said sheath and strip engaging the successive drums, a welding wheel cooperating with each drum to weld the corresponding sheath surface and the cooperating strip section, a power unit driving the drums, means driving continuously at a constant speed, the sheath and strip, a transversely welding station located beyond the longitudinally welding station and adapted to intermittently weld transversely the opposite sides of the sheath and strip together at predetermined points of their length and to cut the weld formed to separate the bags formed from each other, a first compensating system located between the two welding stations and including transverse rollers engaging the sheath and strip and adapted to move with reference to one another to compensate for the intermittent stoppage at the transversely welding station of the sheath and strip fed continuously out of the longitudinally welding station and a compensating and regulating system inserted between the longitudinally welding station and the compensating system and including transverse rollers engaging the sheath and strip, adapted to move with reference to each other and to ensure modifications in speed of the drum driving power unit to make up for any elongation and slipping of the sheath and strip engaging said drums.

2. A machine for making bags of plastic material out of a continuous longitudinally slotted sheath having one side broader than the other and of a closing strip including sections longitudinally welded over the corresponding edges of the sides of the sheath, said machine comprising means feeding the sheath and the closing strip, a longitudinally welding station including two drums having insulating surfaces and adapted to receive each in its turn in edgewise superposition the sheath and the strip from the corresponding means with the opposite surfaces of said sheath and strip engaging the successive drums, a welding wheel cooperating with each drum to weld the corresponding sheath surface and the cooperating strip section, a power unit driving the drums, means driving continuously at a constant speed, the sheath and strip, a transversely welding station located beyond the longitudinally welding station and adapted to intermittently weld transversely the opposite sides of the sheath and strip together at predetermined points of their length and to cut the weld formed to separate the bags formed from each other, a first compensating system located between the two welding stations and including transverse rollers engaging the sheath and strip and adapted to move with reference to one another to compensate for the intermittent stoppage at the transversely welding station of the sheath and strip fed continuously out of the longitudinally welding station and a compensating and regulating system inserted between the longitudinally welding station and the compensating system and including a plurality of transverse rollers having stationary axes, a frame adapted to rock around an axis parallel with said stationary axis, a second plurality of transverse rollers fitted in said frame in parallelism with said frame axis, the sheath and strip engaging in alternation the rollers of both pluralities, switches located on either side of the frame to be engaged thereby upon predetermined shifting thereof under the action of the modifications in length of the sheath and strip due to elongation and slipping of the latter and means whereby the switches, when engaged by the frame, control the speed of the power unit to compensate said elongation and slipping.

References Cited

UNITED STATES PATENTS 2,925,119   2/1960   Jaquiery _____ 93—8
2,971,874   2/1961   Canno _____ 93—8
3,146,147   8/1964   Naser _____ 93—8

GERALD A. DOST, *Primary Examiner.*